US012047418B2

(12) United States Patent
Cam-Winget et al.

(10) Patent No.: US 12,047,418 B2
(45) Date of Patent: Jul. 23, 2024

(54) ADAPTIVE NETWORK CONTROLS FOR IOT AND OTHER APPLICATIONS

(71) Applicant: Cisco Technology, Inc., San Jose, CA (US)

(72) Inventors: Nancy Cam-Winget, Mountain View, CA (US); Jianxin Wang, Saratoga, CA (US); Dieter Derek Weber, Camden, ME (US); Saman Taghavi Zargar, Milpitas, CA (US); Robert Frederick Albach, Austin, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 616 days.

(21) Appl. No.: 16/697,362

(22) Filed: Nov. 27, 2019

(65) Prior Publication Data

US 2020/0389497 A1    Dec. 10, 2020

Related U.S. Application Data

(60) Provisional application No. 62/857,441, filed on Jun. 5, 2019.

(51) Int. Cl.
*H04L 9/40* (2022.01)

(52) U.S. Cl.
CPC ............ *H04L 63/20* (2013.01); *H04L 63/108* (2013.01); *H04L 63/166* (2013.01)

(58) Field of Classification Search
CPC ..... H04L 63/20; H04L 63/166; H04L 63/108; H04L 41/22; H04L 41/0893
See application file for complete search history.

(56) References Cited

U.S. PATENT DOCUMENTS

| 8,514,825 | B1 | 8/2013 | Addepalli et al. |
| 8,705,527 | B1 | 4/2014 | Addepalli et al. |
| 8,718,797 | B1 | 5/2014 | Addepalli et al. |
| 8,848,608 | B1 | 9/2014 | Addepalli et al. |
| 8,863,256 | B1 | 10/2014 | Addepalli et al. |
| 8,903,593 | B1 | 12/2014 | Addepalli et al. |
| 8,989,954 | B1 | 3/2015 | Addepalli et al. |
| 9,036,509 | B1 | 5/2015 | Addepalli et al. |
| 9,083,581 | B1 | 7/2015 | Addepalli et al. |

(Continued)

OTHER PUBLICATIONS

International Search Report and Written Opinion in counterpart International Application No. PCT/US2020/035064, mailed Oct. 1, 2020, 12 pages.

(Continued)

*Primary Examiner* — Clayton R Williams
(74) *Attorney, Agent, or Firm* — Edell, Shapiro & Finnan, LLC

(57) ABSTRACT

Presented herein is a system, device and method that involve creating a policy model and policy rule structure for a policy enforcement point to support policies adapt to rapid changing external conditions in addition to traditional policies that are static. The system facilitates the use of attributes that are either or both dynamically (at run-time) created and/or defined as ephemeral. A new policy attribute may be created dynamically (at run-time). The policy attribute may be mapped as being static or ephemeral. The methodology further involves facilitating evaluation of an attribute as an atomic or programmed set of functions.

20 Claims, 14 Drawing Sheets

(56) References Cited

U.S. PATENT DOCUMENTS

| | | |
|---|---|---|
| 9,154,900 B1 | 10/2015 | Addepalli et al. |
| 9,225,782 B2 | 12/2015 | Addepalli et al. |
| 9,277,370 B2 | 3/2016 | Addepalli et al. |
| 9,654,937 B2 | 5/2017 | Addepalli et al. |
| 9,888,363 B2 | 2/2018 | Addepalli et al. |
| 9,894,101 B2 | 2/2018 | Hendrick et al. |
| 10,110,632 B2 | 10/2018 | Li et al. |
| 10,117,066 B2 | 10/2018 | Addepalli et al. |
| 2012/0182935 A1 | 7/2012 | Addepalli et al. |
| 2013/0246996 A1* | 9/2013 | Duggal ............... G06F 8/35 717/104 |
| 2014/0279808 A1* | 9/2014 | Strassner ........... G06Q 10/06 706/47 |
| 2014/0380442 A1 | 12/2014 | Addepalli et al. |
| 2016/0088049 A1 | 3/2016 | Seed et al. |
| 2016/0105305 A1* | 4/2016 | Pignataro .......... H04L 41/0893 709/223 |
| 2016/0301717 A1* | 10/2016 | Dotan ................ H04L 63/102 |
| 2017/0251339 A1 | 8/2017 | Addepalli et al. |
| 2018/0034701 A1* | 2/2018 | Nagesh ............... H04W 4/70 |
| 2018/0234459 A1 | 8/2018 | Kung et al. |
| 2018/0375887 A1 | 12/2018 | Dezent et al. |
| 2019/0020985 A1 | 1/2019 | Dai et al. |
| 2019/0089587 A1* | 3/2019 | Sampat ............... H04L 41/0233 |
| 2019/0297118 A1* | 9/2019 | Haugsnes ........... H04L 63/1441 |
| 2020/0348662 A1* | 11/2020 | Cella .................. G05B 23/0289 |
| 2020/0389497 A1* | 12/2020 | Cam-Winget ...... H04L 41/0893 |

OTHER PUBLICATIONS

Anupam Das et al., "Personal Privacy Assistant for the Internet of Things", 8 pages, downloaded from Internet Sep. 9, 2019; https://www.ftc.gov.

IoT Security Foundation, "IoT Security Compliance Framework", Release 1.0, 2016, 38 pages, downloaded from Internet Sep. 9, 2019; www.iotsecurityfoundation.org.

GSM Association, "IoT Security Guidelines for Service Ecosystems", Version 1.0, Feb. 8, 2016, 60 pages.

Z. Berkay Celik et al., "IOTGUARD: Dynamic Enforcement of Security and Safety Policy in Commodity IoT", Network and Distributed Systems Security (NDSS) Symposium 2019, Feb. 24-27, 2019, San Diego, CA, 15 pages.

* cited by examiner

```
module: dyn_attr_conf
  +--rw dynamic-attributes
     +--rw dyn-attr-config* [dyn-attr-name]
        +--rw dyn-attr-name          string
        +--rw type?                  enumeration
        +--rw file-path              string
        +--rw invocation-condition?  enumeration
```

FIG.3A

```
                                       +--rw operator?    operator
                                       +--rw port         inet:port-number
           +--: (icmp)
           |  +--rw icmp {match-on-icmp}?
           |     +--rw type?           uint8
           |     +--rw code?           uint8
           |     +--rw rest-of-header? uint32
           +--rw egress-interface?     if:interface-ref
           +--rw ingress-interface?    if:interface-ref
           +--rw dynamic-attributes* [dyn_attr_name]
              +--rw dyn_attr_name       string
              +--rw dyn_attr_condition  string
     +--rw actions
     |  +--rw forwarding?  identityref
     |  +--rw logging?     identityref
     +--ro statistics {acl-aggregate-stats}?
        +--ro matched-packets?  yang:counter64
        +--ro matched-octets?   yang:counter64
+--rw attachment-points
+--rw interface* [interface-id] {interface-attachment}?
   +--rw interface-id       if:interface-ref
```

FIG.3B

```
admin@dieter-iot-test-lnx% show dynamic-attributes
dyn-attr-config isTampered {
    type                script;
    file-path           /home/dieter/iot-fw/iot-firewall/scripts/dyn_attr_scripts/isTampered.lua;
    invocation-condition both;
}
[ok][2019-04-19 14:11:45]

[edit]
admin@dieter-iot-test-lnx% show access-lists
acl acl1 {
    type mixed-eth-ipv4-acl-type;
    aces {
        ace 1001 {
            matches {
                ipv4 {
                    destination-ipv4-network 10.1.2.0/24;
                    source-ipv4-network      10.1.0.10/32;
                }
                dynamic-attributes isTampered {
                    dyn_attr_condition False;
                }
            }
            actions {
                forwarding accept;
            }
        }
        ace 1002 {
            matches {
                ipv4 {
                    destination-ipv4-network 10.1.2.0/24;
                    source-ipv4-network      10.1.1.10/32;
                }
                dynamic-attributes isTampered {
                    dyn_attr_condition False;
                }
            }
            actions {
                forwarding accept;
            }
        }
        ace 1003 {
            actions {
                forwarding drop;
            }
        }
    }
}
```

300 labels the dyn-attr-config isTampered block. 310 labels ace 1001. 320 labels ace 1002.

FIG.3C

```
-- File: inGeoFence.lua
--[[
--- Copyright (c) 2019 by Cisco Systems, Inc.
--- All rights reserved.
--]]
--[[
# Usecase (Detecting if location is within geo fence): inGeoFence
# (True/False) as dynamic/programmable attribute
--]]

function _inGeoFence()
    import_attributes('geofence', 'curr_loc')

return curr_loc:within(geofence)
end function inGeoFence(condition, flow_id, pkt, pkt_len)

condition = ((condition == nil) and true or condition)
    local in_fence = _inGeoFence()
    local rval = not in_fence
    if isTrue(condition) then
        rval = in_fence
    end
    return rval
end function inGeoFence_check(condition)
    return true
end
```

```
-- File: curr_loc.lua
--[[
Positive latitude is above the equator (N), and negative latitude is
below the equator (S).

Positive longitude is east of the prime meridian, while negative
longitude is west of the prime meridian (a north-south line that runs
through a point in England).

Latitude ranges from -90 to 90 from south to north
Longitude ranges from -180 to 180
]]

curr_loc = {
    lat  = 44.249370,
    long = -69.223930, within = function(self, fence)    -- fence is a closed polyline object
    return fence:point_within({x = self.lat, y = self.long})
end
}
```

```
-- File: geofence.lua
--
-- Only load the point_in_polyline function once...
if ((point_in_polyline == nil) or
   (type(point_in_polyline) ~= "function")) then
    local f = loadfile("/tmp/polyline.lua")
    f()
end geofence = {
    -- x -> latitude, y -> longitude
    fence = {
        { x = 44.0000, y = -69.0000 },
        { x = 45.0000, y = -69.0000 },
        { x = 45.0000, y = -70.0000 },
        { x = 44.0000, y = -70.0000 }
    },
    point_within = function (self, point)
        return point_in_polyline(self.fence, point)
    end
}
```

```
-- File: curr_loc.lua
--[[
Positive latitude is above the equator (N), and negative latitude is
below the equator (S).
Positive longitude is east of the prime meridian, while negative
longitude is west of the prime meridian (a north-south line that runs
through a point in England).
Latitude ranges from -90 to 90 from south to north
Longitude ranges from -180 to 180
--]]
curr_loc = {
    lat  =  44.249378,
    long = -69.229930,
    within = function (self, fence)    -- fence is a closed polyline object
        return fence:point_within({x = self.lat, y = self.long})
    end
}
``` inGeoFence = {current location is within the geofence boundary}
inGeoFence? True/False

— 400

```
-- File: inGeoFence.lua
--[[
--- Copyright (c) 2019 by Cisco Systems, Inc.
--- All rights reserved.
--]]
--[[
# Usecase (Detecting if location is within geo fence): inGeoFence
# (True/False) as dynamic/programmable attribute
--]]
function _inGeoFence()
    import_attributes('geofence', 'curr_loc')
    return curr_loc:within(geofence)
end function inGeoFence(condition, flow_id, pkt, pkt_len)
    condition = ((condition == nil) and true or condition)
    local in_fence = _inGeoFence()
    local rval = not in_fence
    if isTrue(condition) then
        rval = in_fence
    end
    return rval
end function inGeoFence_check(condition)
    return true
end
```

— 410

```
-- File: geofence.lua
-- Only load the point_in_polyline function once...
if ((point_in_polyline == nil) or
    (type(point_in_polyline) == "function")) then
    local f = loadfile("/tmp/polyline.lua")
    f()
end geofence = {
    -- x -> latitude, y -> longitude
    fence = {
        { x =  44.0000, y = -69.0000 },
        { x =  45.0000, y = -69.0000 },
        { x =  45.0000, y = -70.0000 },
        { x =  44.0000, y = -70.0000 }
    },
    point_within = function (self, point)
        return point_in_polyline(self.fence, point)
    end
}
```

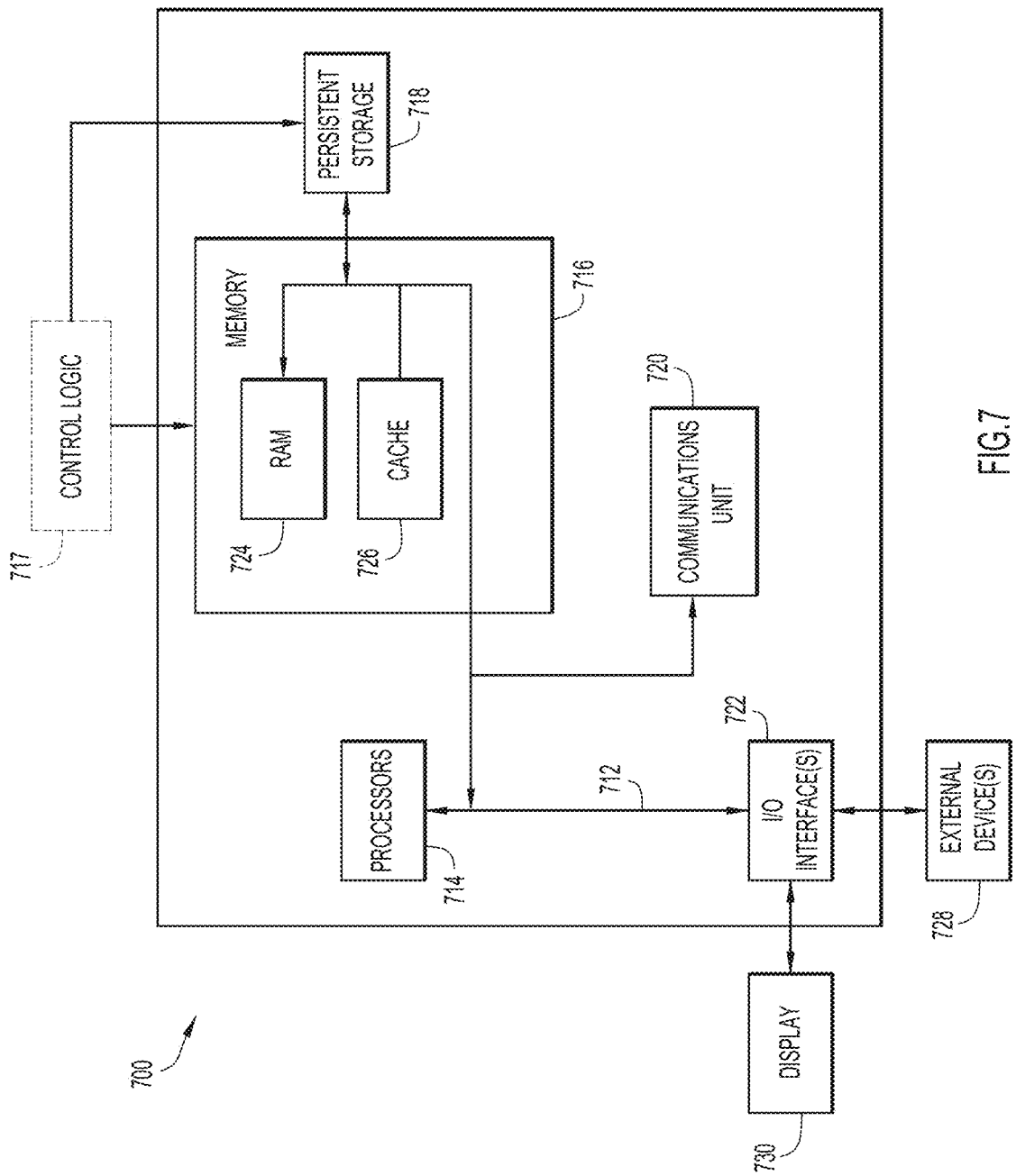

ADAPTIVE NETWORK CONTROLS FOR IOT AND OTHER APPLICATIONS

PRIORITY CLAIM

This application claims priority to U.S. Provisional Application No. 62/857,441, filed Jun. 5, 2019, the entirety of which is incorporated herein by reference.

TECHNICAL FIELD

The present disclosure relates to Internet of Things (IoT) applications.

BACKGROUND

In the Internet of Things (IoT) world, more and varied devices are being connected to closed or open networks. As these devices communicate through the network (both internal or publicly through the Internet) they present use cases that impose requirements that go beyond those of the traditional connected computing or networking devices.

Such additional requirements may include external factors. For example, is the robot in a particular functional state, is a patient rehabilitation equipment being used, is the equipment in a designated area, are there humans in the interlock area, etc. Depending on the state of the device, different policies may be appropriate. These factors go beyond network or compute related states. As the conditions to be enforced may be manifest with physical, kinetic results, physical or operational state attributes of the system are to be considered. Furthermore, the determination of that physical or operational state may be compounded by a dynamic ability to seek inputs that contribute to the proper verdict of state.

BRIEF DESCRIPTION OF THE DRAWINGS

FIG. 3A is an example of a data model useful to define dynamic programmable attributes that enable writing policies incorporating such attributes, according to an example embodiment.

FIG. 3B shows an example of extending a data model to provide support for authoring policies with dynamic attributes, according to an example embodiment.

FIG. 3C illustrates an example of an output of a command line interface (CLI) of an example dynamic attribute, according to an example embodiment.

FIGS. 4A-4C show examples of scripts used to evaluate a programmable attribute, according to an example embodiment.

FIG. 4D illustrates how the scripts of FIGS. 4A-4C may be invoked and applied as environmental/external conditions change, according to an example embodiment.

FIG. 7 is a block diagram of a computing device that may be configured to perform the various operations presented herein, according to an example embodiment.

DESCRIPTION OF EXAMPLE EMBODIMENTS

Overview

Figure 1:
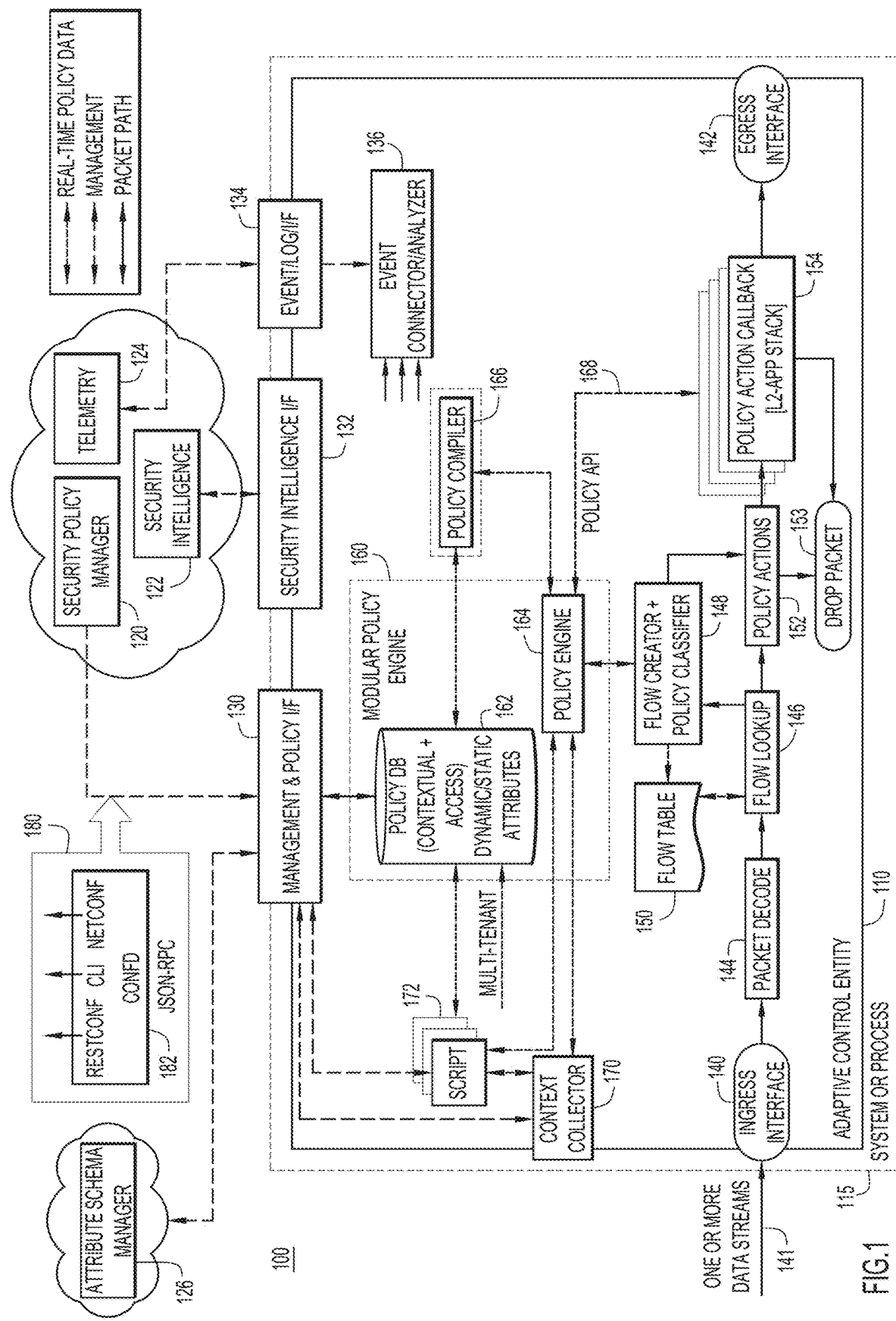
FIG. 1 is a block diagram of an adaptive control system according to an example embodiment.

Presented herein is a system, device and method that involve creating a policy model and policy rule structure for a policy enforcement point to support policies adapt to rapid changing external conditions in addition to traditional policies that are static. The system facilitates the use of attributes that are either or both dynamically (at run-time) created and/or defined as ephemeral. A new policy attribute may be created dynamically (at run-time). The policy attribute may be mapped as being static or ephemeral. The methodology further involves facilitating evaluation of an attribute as an atomic or programmed set of functions.

In one form, a method is provided. The method includes, at run-time of an adaptive control entity, programming a policy that is associated with a state of an operational environment of a system or process; programming at least one attribute to be used by the policy, the at least one attribute related to the state of the operational environment of the system or process; programming at least one rule of the policy that references the at least one attribute; and evaluating one or more data streams received by the adaptive control entity against the policy to determine an outcome.

EXAMPLE EMBODIMENTS

With the rapid growth and popularity of IoT, operations (versus data) driven devices are connecting to both closed and open networks. As the purpose of the devices is to fulfill a physical task and effectively improve operations efficiency and manageability, requirements beyond traditional connected computing or networking access controls become imminent. For instance, to ensure safety, external factors such as preventing healthcare devices from harming humans, or utility equipment from disrupting services to catastrophic events (e.g. power grid shutdown, nuclear meltdown, etc.) involve dynamic operational state information to be part of the policy decision and enforcement processes. That is, such policies involve the policy enforcement points to adapt to the ever-changing environment around them when compared with traditional policy enforcement points, which only have static policies even if they are beyond network attributes (e.g., identity based). Traditional network access control and policies cannot address such forthcoming IoT external/environmental policy requirements. Moreover, one of the main properties of such external factors is that they could be ephemeral. Therefore, the inclusion of external factors in an enforcement point's policy and its decision making is what defines Adaptive Network Policy useful for IoT environments.

To properly address IoT use cases in an operations-based deployment, two distinct requirements in the policy definition, decision and enforcement are highlighted:

1. An organization's operational structure is uniquely deployed with both business and operations (including safety) policies involving considerations about their unique operations-based assets and states (as opposed to network or compute posture).

2. The state(s) may be ephemeral.

Furthermore, with the breadth of devices being deployed and connected to the network, deploying a platform for policy decision and enforcement becomes a challenge as the policy set of attributes come predefined by the platform vendor. Customers are now challenged to conform to such a set of attributes to determine how best to address their business and operations policies. Some policies are prohibitive as they cannot be defined within the platform's policy vocabulary.

These requirements are what trigger a need for adaptive systems to facilitate both the customization of the states unique to an operational environment and a need for real-time evaluation of such states during the policy decision and enforcement.

Moreover, today's enforcement points, especially in the IoT space (but not limited to IoT), are restricted to using only the policy attributes predefined by vendors and their solutions, limiting how business policies can be realized. The ability to define Adaptive Network Policies with the support for defining new policy attributes and their semantic evaluation at run-time is important for the next generation of enforcement points.

The solution presented herein involves an overall system to accommodate for the definition of the new (customized) policy attributes (i.e., states) and their semantic/mapping for evaluation, an adaptive policy model to customize the policy attributes (i.e., states) definitions, and a policy engine to facilitate the evaluation of the policy attributes (i.e., states) according to the asserted policy.

The Adaptive Control System

FIG. 1 shows a block diagram of the adaptive control system 100 according to an example embodiment. The adaptive control system 100 includes a policy enforcement point or adaptive control entity 110, which in this example is a firewall, and several external functions (external to the adaptive control entity) that are in communication with the adaptive control entity 110. These external functions may be cloud-based, in some use cases. The adaptive control entity 110 may be integrated within or associated with (in communication with) a system or process 115. The system or process 115 may be a network (e.g., an enterprise network or home network), a network device, a vehicle, a robot, medical equipment, an IoT device (e.g., temperature sensor, etc.), an industrial process, or any other physical entity, software entity system or process for which communication into or from, is to be adaptively controlled.

The external functions that communicate with the adaptive control entity 110 may include, for example, a security policy manager 120, security intelligence function 122, telemetry function 124 as well as an attribute schema manager 126. The adaptive control entity 110 includes a management and policy interface (I/F) 130 that enables communications with the security policy manager 120, a security intelligence I/F 132 that enables communications with the security intelligence function 122 and an event/log I/F 134 that enables communication with the telemetry function 124. The event/log I/F 134 is coupled to an event connector/analyzer 136 residing on the adaptive control entity 110.

The adaptive control entity 110 includes an ingress interface 140 at which one or more incoming data streams 141 are received and an egress interface 142 from which one or more outgoing data streams are sent. The one or more data streams may be network traffic (arriving at the ingress interface from a network) or they may be general data (not network-based) that originates from an external entity, such as a resource in a datacenter, for example. Between the ingress interface 140 and the egress interface 142 are several functions, including packet decode 144 (for use when the incoming data streams are network flows), flow lookup 146 (which uses a flow creator and policy classifier 148 and a flow table 150), policy actions 152 that can cause a packet to be dropped (as shown at 153) or be applied by any of a plurality of policy action callback functions 154. The cascaded policy action callback functions 154 use any dynamic attributes as part of an enforcement policy, as well as on a per-packet basis, as part of a flow, if so configured. As explained above, the adaptive control entity 110 may control (permit or deny) a data stream received at the ingress interface 140 and/or control (permit or deny) a data stream to be sent via the egress interface 142.

The flow creator and policy classifier 148 interact with a modular policy engine entity 160 that includes a policy database (DB) 162 that stores contextual and access policies as well as dynamic/static attributes, and a policy engine 164. The policy engine 164 and the policy database 162 interact with a policy compiler 166. The policy engine 164 also interacts, via a policy Application Programming Interface (API) 168, with the policy action callback functions 154. Further, the policy engine 164 is in communication with a context collector 170, which in turn is coupled to the management and policy I/F 130.

A plurality of scripts 172 are maintained on the adaptive control entity 110 to control operations of the policy engine 164. For example, these scripts 172 may use the Lua programming language.

The management and policy I/F 130 may employ one or more standards, such as, for example, JavaScript Object Notation (JSON)-Remote Procedure Call (RPC) 180. JSON-RPC 180 works by sending a request to a server implementing this protocol. The client is typically software intending to call a single method of a remote system. Multiple input parameters can be passed to as an array or object. The objects of the JSON-RPC may take the form of Representational State Transfer CONF (RESTCONF), Command Line Interface (CLI), Network Configuration Protocol (NETCONF), etc. RESTCONF is an IETF protocol that describes how to map a YANG (objects) specification to a RESTful interface. The REST-like API provides an additional simplified interface that follows REST-like principles and is compatible with a resource-oriented device abstraction. NETCONF is a protocol defined by the IETF to install, manipulate, and delete the configuration of network devices. NETCONF operations are realized on top of an RPC layer and provides a basic set of operations to edit and query configuration on a network device.

The adaptive control entity 110 shown in FIG. 1 uses JSON-RPC 180 as its control plane, in accordance with one example. Confd 182 is a configuration management system that can actively watch a consistent key-value store and change configuration files based on templates whenever those keys change. Confd allow to present the adaptive control entity 110 with data model in YANG so that it can compile the YANG models and generate all the standard northbound interfaces such as RESTCONF, NETCONF, and CLI. The adaptive control entity 110 has some configuration scripts (backend scripts for Confd) through which subscription is made to all the changes (pub/sub model) to the policy enforcement point data model in Confd. Upon changes on any/all of the enabled northbound interfaces (listed above), which Confd manages for the adaptive control entity 110, those scripts will communicate back with the adaptive control entity 110 through JSON-RPC 180 to effectively make the changes. Confd 182 communicates with an operational script upon any query made from the northbound interfaces and the operational scripts then communicate back with the adaptive control entity 110 via JSON-RPC 180 to obtain the requested operational data back to Confd 182 and the original requester.

The attribute schema manager 126 is used, for example, by IT managers to push or add programmable attributes to the adaptive control entity 110. These attributes are described in more detail below. The security policy manager 120 is used, for example, by the operations manager that would be managing the policy as to who gets to use which attributes for purposes of configuring operations of the adaptive control entity 110. Separating the functions of the security policy manager 120 and the attribute schema manager 126 may be useful for IoT use cases, but it should be understood that these functions may be integrated into one entity for certain other use cases, such as enterprise use cases.

The system 100 allows for the programming of attributes into the adaptive control entity 110. The attributes are not already predefined in the adaptive control entity. More specifically, one or more attributes may be dynamically programmed into the adaptive control entity 110 at run-time. This means that there is no need to compile or re-compile the software of the adaptive control entity 110. The policy attributes can take effect, and be used by a policy, without having to reboot, or update/patch software of the adaptive control entity 110. This capability results from invoking a dynamic or a scripting language (such as Lua, as described below) or Python™. The adaptive control entity 110 uses a compiler for Lua, called LuaJIT, that allows for ingesting scripts and the adaptive control entity 110 is configured to use the script in specific ways, such as to ingest one or more data streams which are then evaluated against one or more policies to determine an enforcement outcome. A policy is defined by a data model of which a known set of attributes are used as the guidance for how to process the data stream, e.g. perform evaluations. The expression of a policy may be by way of one or more rules that are used to reach the final policy decision (e.g., if attribute1 and 2 are true then allow/deny). Enforcement is affect the actual allow/deny evaluation decision.

Thus, programming a new attribute is akin to adding words to a vocabulary that a policy may use. When defining/programming the new attribute, one can also program how the policy engine 164 is to evaluate that attribute, the attribute schema manager 126 fulfills that function. Furthermore, due to the dynamic nature of this attribute programming capability, the adaptive control entity 110 can tap into multiple sources for policy evaluation; the sources can be either network-based or not network-based.

Figure 2A:
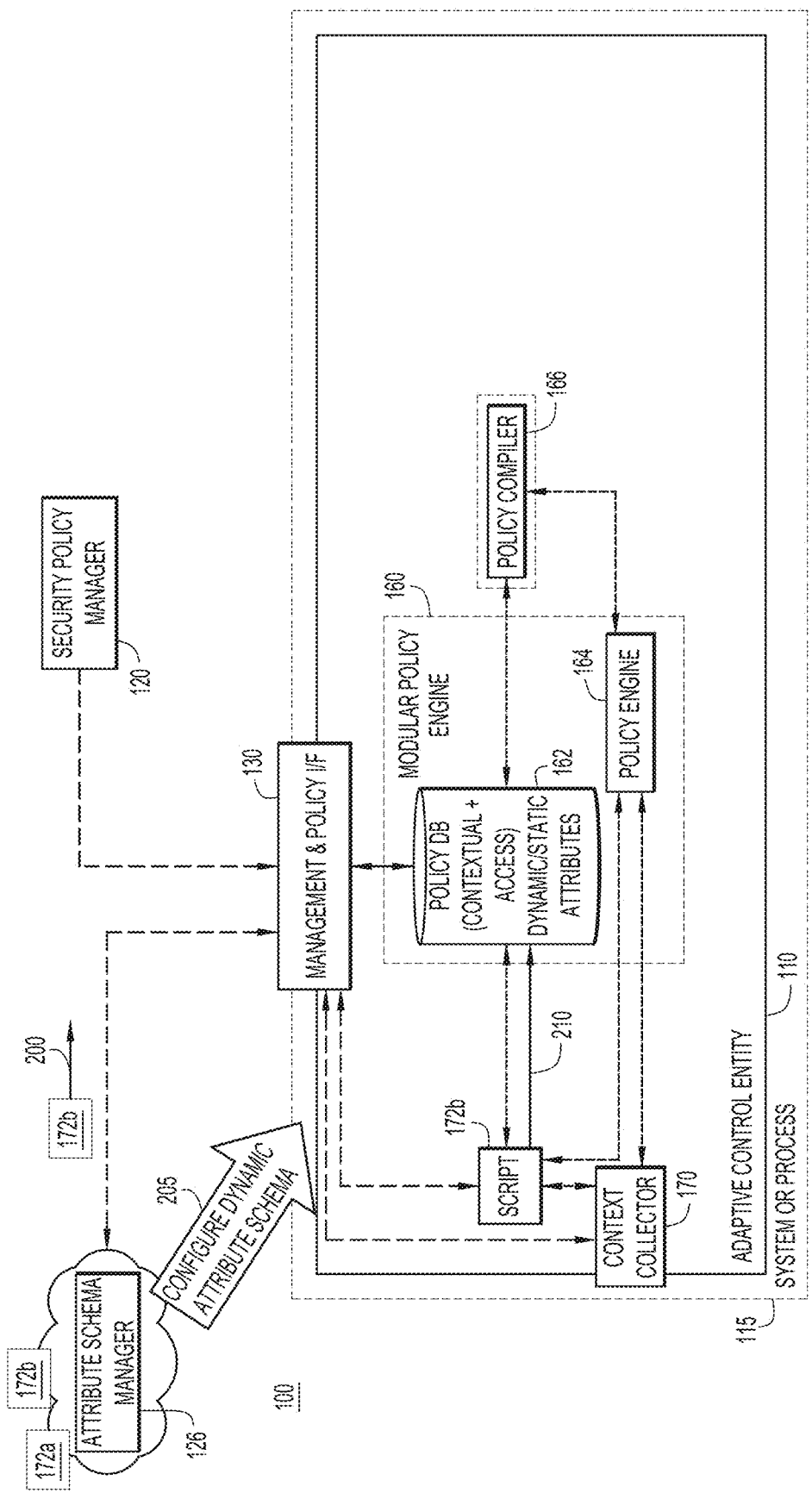
FIGS. 2A-2C are diagrams depicting operations performed by the adaptive control system, according to an example embodiment.
Figure 2B:
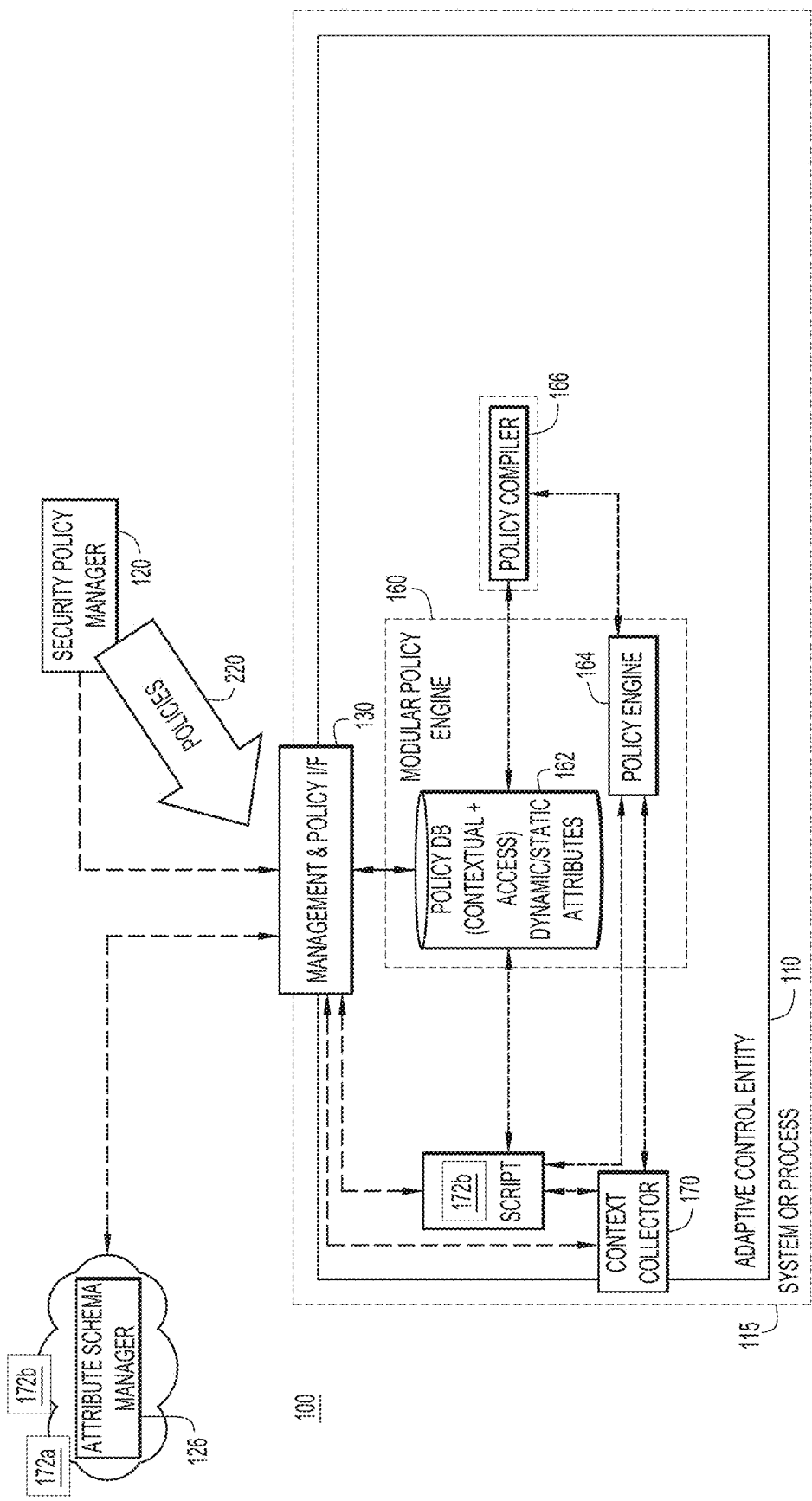
Figure 2C:
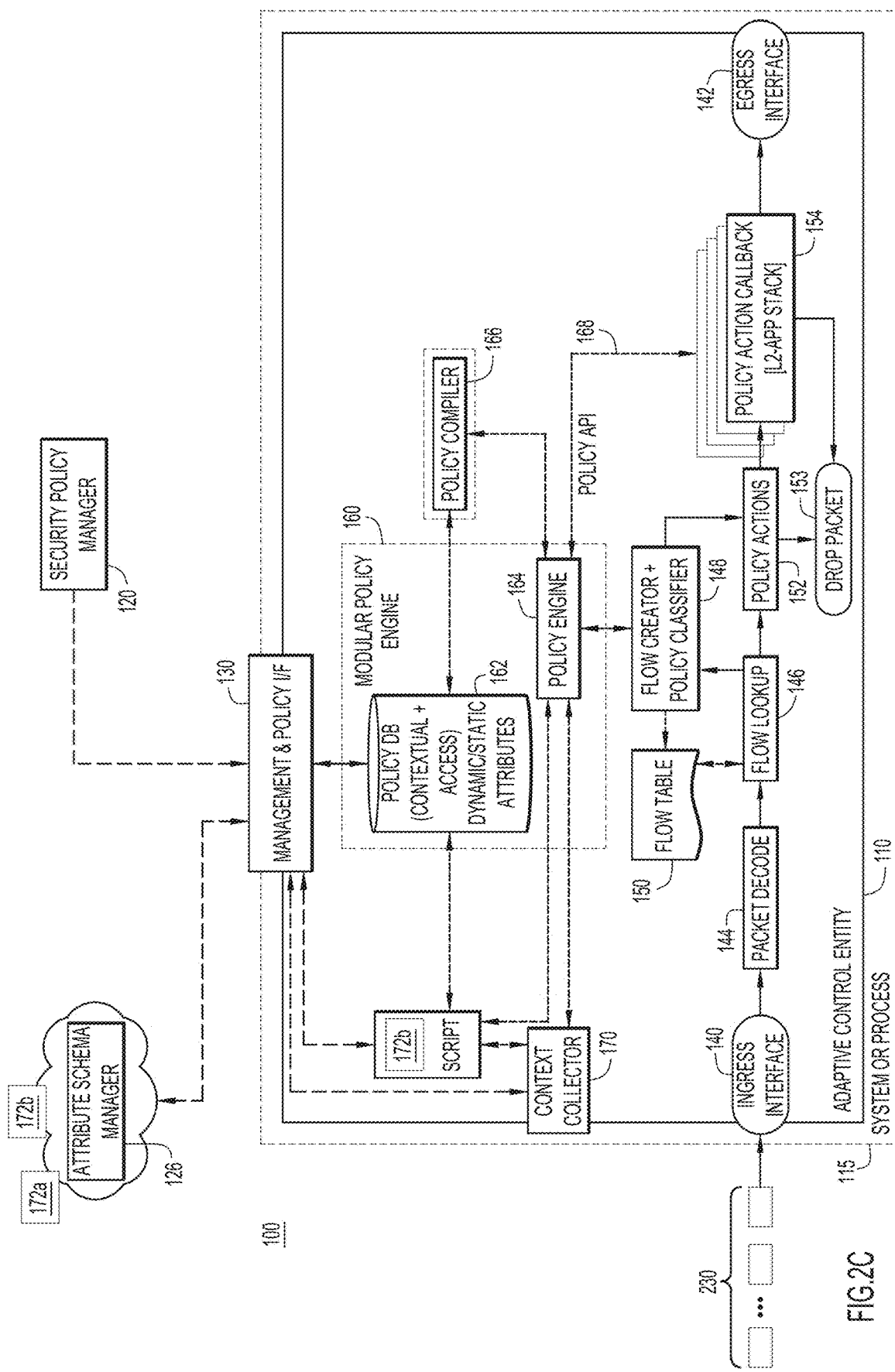

Reference is now made to FIGS. 2A-2C for an explanation of a workflow for defining a new adaptive network policy attribute to the adaptive control entity 110 and authoring policies comprising the newly defined attribute. Step 1. Configuring Policy Enforcement Point to Accept New Dynamic Attribute As shown in FIG. 2A, a process is provided by which the attribute schema manager 126 is used to configure a policy schema that includes dynamic attributes on the adaptive control entity 110. This configures the adaptive control entity 110 to accept policies with one or more dynamic attribute. The attribute schema manager 126 (e.g., InfoSec or IT personnel), first, writes an attribute evaluator script, examples of such are shown at 172a and 172b. For example, one script 172b is called isTampered.lua. At 200, the attribute schema manager 126 pushes the script 172b to the predefined location in the adaptive control entity 110. Then, via APIs shown 205, the attribute schema manager 126 defines a new attribute in the policy schema (i.e., "isTampered" in the example below) on the adaptive control entity 110 through the management and policy I/F 130 of the adaptive control entity 110 and complying with the data model of the adaptive control entity 110 (such as, for example, the YANG data model). In other words, the attribute schema manager 126 configures the policy decision and enforcement point to accept a newly defined attribute and pushes the script (e.g., isTampered.lua) that is going to be used for evaluation of the attribute to the adaptive control entity 110. Finally, at 210, the dynamic programmed attribute is saved in the attribute database.

An example of the dynamic attribute scheme for isTampered is as follows.
DynAttrName: isTampered
Type: Script
Script/File path: /tmp/isTampered.lua
Invocation: Per Packet or Per-Flow or both The system 100 may support numerous types of attributes, and how the attributes are evaluated may be defined in terms of programmable scripts. This allows a user to define/crate policies (security policies) using these attributes once they are programmed into the adaptive control entity 110. This makes the operations of the adaptive control entity 110 truly dynamic. The operations of the policy enforcement point 110 has nothing to do with anything that has been programmed in it previously. Rather, the adaptive control entity 110 is run-time configurable. That is, the adaptive control entity 110 can be configured at any time once it is up and running, without the need to compile the software or perform a reboot.

The programmable attribute can evaluated using a script, or it can be evaluated based on content of a file stored by the adaptive control entity 110. Thus, either the script to evaluate the attribute is programmed, or an indication of where the file is located to be evaluated is programmed into the adaptive control entity 110.

In one embodiment, the attribute can be evaluated in three ways: per-packet, per-flow or both.

Per-packet evaluation means that every datagram or packet in a flow is examined by the script. The script has the ability to see the packet and to evaluate the metadata of the packet and then act on that. There is a lot of flexibility in the programming for per-packet evaluation.

Per-flow evaluation means that as part of the policy decision, the policy enforcement point determines whether this flow is permitted at all or is it just dropped/denied.

A particular attribute may be employed to evaluate whether the flow should be created in the first place and then used later on, on a per-packet basis. Once an attribute has been pushed into the adaptive control entity 110 and verified that it is valid, then operators can configure it in a security policy.

Thus, as depicted in FIG. 2A, before policies are actually deployed, the adaptive control entity 110 is updated to a "known data model", where the data model is input via APIs 205. The data model may include one or more new attributes (operational data labels as referred to above). Those labels in turn map to scripts (172a/172b) that are also sent to adaptive control entity 110 using the attribute schema manager 126 and APIs 205. Notably, this happens while the adaptive control entity 110 is deployed, and perhaps running (e.g. the actual adaptive control entity software is not changed). The "known data model" with the attributes and the scripts is stored in the policy DB 162.

Step 2. Pushing Policies with Newly Added Dynamic Attribute Through a Data Model As shown in FIG. 2B, once the newly defined attribute is programmed and installed in the adaptive control entity 110, the security policy manager 120 (e.g., operations or IT personnel) can see the updated data model (e.g., the Yet Another Next Generation (YANG) data model) of the adaptive control entity 110 with the newly defined attribute to then author policies incorporating the newly added attribute. In other words, with the "known data model" stored in the policy DB 162, an IT or Operations person can then configure on the adaptive control entity 110 the actual policies they want enforced. For instance, the IT personnel could write a policy (deny Vehicle access→LocalSite TCP isTampered:TRUE) with the isTampered attribute which has been defined to be evaluated based on some conditions and to return TRUE/FALSE. The policy in this example simply denies any Transmission Control Protocol (TCP) traffic from the Vehicle to the LocalSite if and when isTampered is TRUE.

Policy definition is made through the security policy manager 120 and then passed to the adaptive control entity via APIs shown 220. These policies are also stored in policy DB 162. Again, this occurs while the adaptive control entity 110 is deployed and running.

The process depicted in FIG. 2B involves applying a programmed attribute to a particular policy. The policy could be a standard access control list (ACL) access list and include the attribute as part of the condition, in addition to a five-tuple of an incoming packet.

The enhancement offered by the techniques presented herein is that a particular access list can use programmable, dynamic attributes, to aid in the evaluation of the policy and, and determine whether or not traffic should flow or not.

Moreover, when an attribute is first configured on the policy enforcement point, a test is made to ensure that the evaluation script, if one is to be used to evaluate the attribute, is syntactically correct so early feedback is provided as to whether or not the attribute and script are configured correctly so that the script can be executed properly.

When a policy is configured on the adaptive control entity 110, because there may need to be a match to a five-tuple and other conditions before a script is executed, it could be days or weeks later before conditions match to trigger the policy. Consequently, when a policy is installed, a check is made that the condition can be parsed and any applicable script can execute properly.

Step 3. Evaluating Dynamic Attributes as Specified by Policy on a Per-Flow/Per-Packet/Both Basis As shown in FIG. 2C, the condition(s) for which the newly defined attribute(s) are evaluated are written in the script that was pushed into the enforcement point in step 1 above. Such scripts and their conditions may be evaluated/invocated either per-flow, per-packet, or both per-packet and per-flow. This figure shows that data packets 230 arrive at the ingress interface 140. If a policy is to be applied per-flow, a look up is made in the policy database 162. The scripts and/or the attributes are evaluated at flow creation time (the first packet of that flow that arrives at the ingress interface 14) if the policy is to be applied on a per-flow basis. If the policy is to be applied per-packet, the policy action callback functions 154 are applied to determine whether to drop a packet (as shown at 153) or let it pass to the egress interface 142.

The adaptive control entity 110 keeps track of the results are every condition and script that is passed in and a metadata attribute may be configured with the script that indicates that this script is based solely on the condition. A script may be applied regardless of what is in the packet that is being evaluated. For example, if nothing has changed then the adaptive control entity 110 does not actually execute the script and instead takes the results of the last time it was run. Thus, the scripts do not negatively impact the performance of the adaptive control entity 110.

Furthermore, the attribute is used at policy evaluation/decision before enforcement. It is possible to decouple the policy decision from policy enforcement.

The Adaptive Policy Model

In order to define new dynamic attributes and then write policies incorporating such attributes, the data model of the adaptive control entity 110 supports a dynamic attribute schema definition. For instance, if the adaptive control entity 110 employs YANG as a data model, a new YANG model attribute (i.e., dyn_attr_conf.yang) may be added to provide support for dynamic attribute schema definition. This is shown in FIG. 3A. Moreover, if the adaptive control entity 110 uses YANG and already has a YANG model for access control policy (e.g., ietf-access-control.yang), that model could be extended to add the support for authoring policies with dynamic attributes and by supporting the attribute name and condition as shown in the example depicted in FIG. 3B.

Thus, FIGS. 3A and 3B illustrate that a data model, such as the YANG data model, for programming dynamic attributes on the adaptive control entity 110. As shown in both FIGS. 3A and 3B, the condition(s) under which the attribute is evaluated (per-packet or per-flow) is part of the definition of the attribute. Each attribute is given a name, an invocation condition, and whether it is to be invoked on a per-flow basis or per-packet basis.

As shown in FIG. 3A, the attribute is given a name, a type (script, file, or other types), file-path (where it is located) and the invocation condition (per-flow, per-packet or both). Again, the evaluation of the attribute may involve evaluating/checking existence of a file in the file system of the host entity, a Boolean relationship with other parameters, etc.

FIG. 3C shows an example of the output of a command line interface (CLI) of the dynamic attribute "isTampered" that was defined through "dyn_attr_conf.yang" YANG model and the policy that incorporates the "isTampered" dynamic attribute which was authored and added to the policy enforcement point through extended version of the "ietf-access-control.yang" YANG model.

As shown at 300, the attribute isTampered is defined, with a type of "script", a file-path (location) of "/home/dieter/iot-fw/iot-firewall/scripts/dyn attri-scripts/isTampered.lua", and the invocation-condition is "both", meaning per-packet and per-flow. As shown at 310 and 320, a policy is written that incorporates the isTampered attribute to be checked for whether it is True or False.

Again, FIGS. 3A-3C are the examples of how the attributes are actually defined and configured. Scripts are executed when a policy calls for one or more attributes ("operational data label") using, for example, the LuaJIT script 172b shown in FIGS. 2A-C.

FIGS. 4A-4C show an example of evaluator scripts for a dynamic attribute "inGeoFence". This is an example of an actual attribute that may be used to evaluate whether host entity (e.g., a vehicle) is within a geographic boundary. FIG. 4A illustrates at 400 the script for inGeoFence.lua, FIG. 4B illustrates at 410 the script for curr_loc.lua, and FIG. 4C illustrates at 420 the script for geofence.lua.

The return value of the inGeoFence script is either True or False allowing to write policies with inGeoFence:True or inGeoFence:False. The condition that is defined for the inGeoFence evaluator script is dependent on two other scripts (i.e., curr_loc.lua and geofence.lua) values. Those scripts' values are assumed to be changed by the environment that the enforcement point is deployed on. In other words, the script author has the knowledge and freedom to call on/import the values of the environment/external factors available to him/her on the deployment environment in the script. In this example, the author imported geofence.lua and Curr_loc.lua to determine if the condition of the script evaluates to True or False. The condition as it is defined for the inGeoFence is defined as "it returns True if the current location of the policy subject is within a predefined geofence". The predefined geofence is simply, in this example, a rectangle defined in geofence.lua. The current location of the policy subject (e.g., a vehicle) is defined by latitude and longitude in the Curr_loc.lua.

There are two key parts to the script and any attribute that may be added. There is inGeoFence and that is the name of the attribute. The underscore function, function_inGeoFence( ) is used as a helper to help evaluate the attribute by reading ephemeral data out of the applicable files. The function that is called matches the attribute name.

The inGeoFence condition is called, depending on whether it is used per-flow or per-packet, based on a flow identifier (flow_id), packet (pkt) and packet length (pkt_len).

This is useful, for example, to do per-packet inspection. It is possible to evaluate the packet with any (known or unknown) protocol by changing the configuration to a deeper inspection in the packet than what is currently done by hard-coded programming. Packet evaluation may include particular locations within packets. A decoder may be created in a script (e.g., Lua script) to do a further lookup based on additional rules.

The third function in this file is inGeoFence_check. The function returns a True (T) or False (F) depending on whether the condition can be parsed. The condition could be quite complex and it is important to ensure that it can be parsed/evaluated.

The import_attributes function imports the geofence attribute and current location.

FIG. 4B illustrates the script for curr.loc.lua, and FIG. 4C illustrates the script for geofence.lua.

FIG. 4D illustrates how the evaluation of scripts 410 and 420 are used by script 400. Depending on the invocation condition of the evaluation script (per-packet, per-flow, or both), the script 400 for inGeoFence.lua gets evaluated in real-time and as the environmental/external conditions (in this example, current location of the vehicle and the geofence) are changed.

Enabling Ephemerality into Policy Rules

A use case example is presented of a rule that involves one or more ephemeral states or conditions of an operational environment of a system or process in which the adaptive control entity 110 is integrated or with which the adaptive control entity is associated. A policy can be used that involves 3 types of attributes:

1. The classical attribute (i.e., asset type/5-tuple).
2. A simple ephemeral attribute (i.e., retrieve a value from a bit/file, CarEngine:On/Off).
3. A programmed ephemeral attribute that requires a more complex evaluation, such as that performed by a script (e.g., inGeoFence:True/False, or isTampered:True/False).

Rule/Policy Example 1

Figure 5:
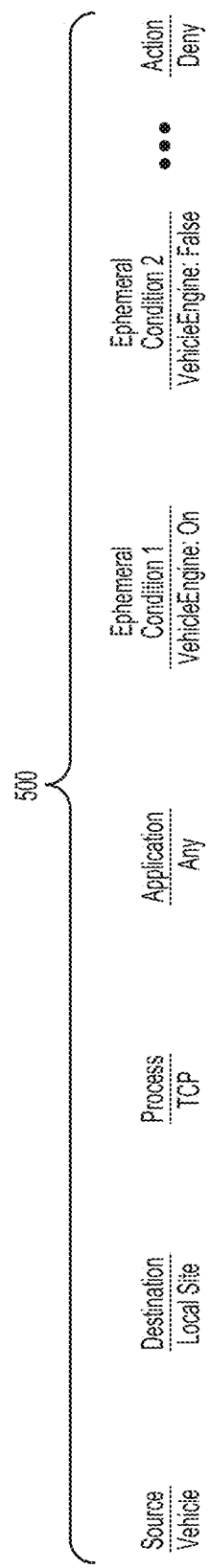
FIG. 5 is a diagram depicting an example of a policy that uses a programmable attribute and is based on one or more ephemeral conditions, according to an example embodiment.

Reference is made to FIG. 5. FIG. 5 shows attributes of an example policy 500 that is based on Source of a packet, Destination of the packet, Process (network or non-network based), Application, at least one ephemeral condition (in this example there are two ephemeral conditions) and an Action (Permit the packet or Deny the Packet). The Source of the packet could be a network-based source (specified by an IP address, for example), or it may be a particular entity or data resource in a system or in a datacenter. Likewise, the Destination of the packet could be a network-based source (specified by an IP address) or it may be a particular entity in a system or in a datacenter, for example. The Process can be any process or process state, such as a protocol in the case of a network-based process, or an application or storage location, in the case of a datacenter, for example. In one example, the Process is the Transmission Control Protocol (TCP). The Application can be any application that may be running on the system or as part of the process with which the adaptive control entity is associated. The one or more Ephemeral Conditions can be any condition of the operational environment (e.g., temperature or location) of the system or process, and which can change at any point in time.

In one example, the system to which the adaptive control entity is associated is a Vehicle (which is the Source of the packet, the Ephemeral Condition 1 is whether the Vehicle Engine is On, and the Ephemeral Condition 2 is whether the Vehicle is outside the location area defined by inGeoFence (inGeoFence:False). The Action to be taken with respect to the incoming data (data stream) is to Deny or Drop it. In other words, the policy 500 says that the Vehicle cannot communicate (i.e., Deny) to LocalSite (e.g., certain IP address) on any port/Application if its engine is On (which is a simple ephemeral attribute) and if its current geographical location is not within a predefined geofence (inGeoFence is a programmed ephemeral attribute that uses a more complex script for evaluation).

It should be understood that additional attributes may be included in the policy 500, such as Source Port, Destination Port, etc. Thus, a network-based 5-tuple may be used by a Policy together with the one or more ephemeral conditions. An arbitrary type and number of conditions may be evaluated as part of a security policy, based on static information and/or ephemeral information that is checked/evaluated in real-time and could change at any moment.

The dynamic and programmable nature of the attributes used by a policy provides a capability not heretofore known. These attributes cannot be used until they have been programmed, but after they are configured, they are available for use in a policy definition.

Rule/Policy Example 2

The external/ephemeral condition may require that a threshold of evidentiary conditions be met to determine a True/False state. As an example, a geolocation reference could require a minimum 2 out of 3 of the following with at least one Global Positioning System (GPS) reference: (an IP referenced geolocation) AND (a GPS location) AND (a connection to a wireless access point with a separate GPS location) all within the location reference.

Figure 6:
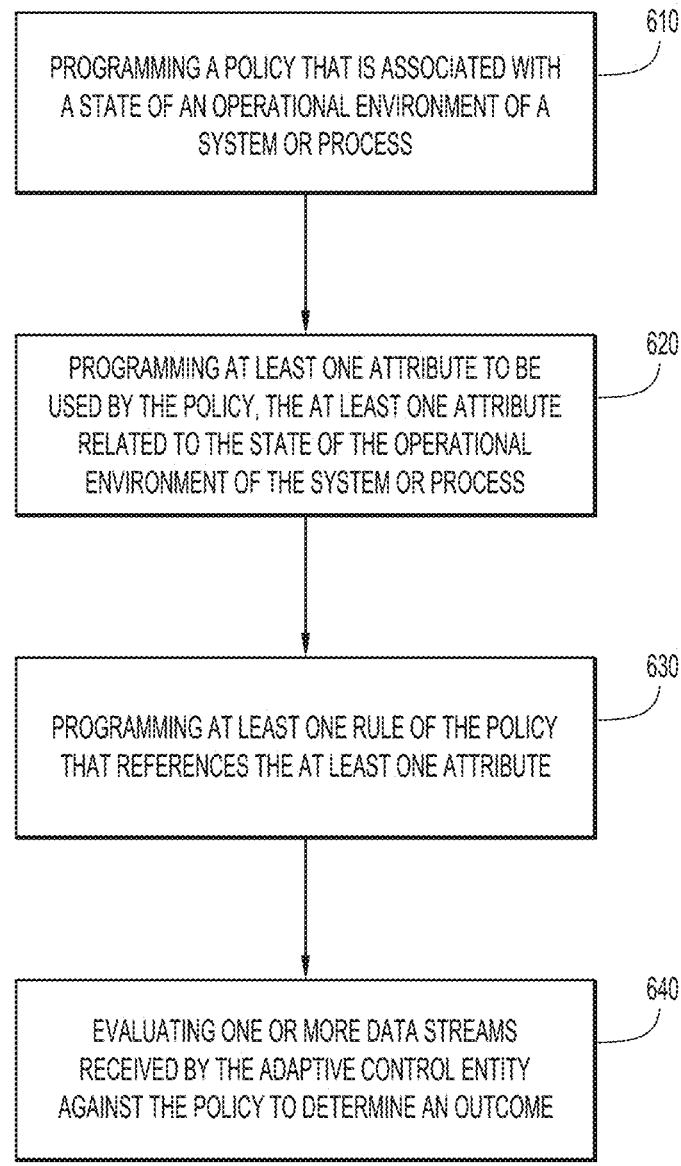
FIG. 6 is a flow chart of a method according to an example embodiment.

Reference is now made to FIG. 6. FIG. 6 illustrates a flow chart for a method 600 according to an example embodiment. The method 600 is performed at run-time of an adaptive control entity as described above. That is, the adaptive control entity is deployed and running at the time the method 600 is performed. At 610, the method 600 involves programming a policy that is associated with a state of an operational environment of a system or process. The policy is associated with a state of an operational environment of a system or process. At 620, the method 600 includes programming at least one attribute to be used by the policy, the at least one attribute related to (or descriptive of) the state of the operational environment of the system or process. As described above, the at least one attribute may be associated with an ephemeral condition of the operational environment of the system or process. In one example, the at least attribute is related to content of a file stored by the adaptive control entity. At 630, the method 600 involves programming at least one rule of the policy that references the at least one attribute. Then, at 640, the method 600 includes evaluating one or more data streams received by the adaptive control entity against the policy to determine an outcome.

In one form, the at least one attribute is not predefined on the adaptive control entity. In other words, the at least one attribute is not already programmed into the adaptive control entity prior to booting up the adaptive control entity, and entering a run-time mode of the adaptive control entity. Rather, the at least one attribute is programmed, at run-time, into the adaptive control entity. In other words, the programming operation 620 involves programming the at least one attribute in the adaptive control entity via an interface, such as the management and policy interface 130 (FIG. 1), with an external entity, such as the security policy manager 120 (FIG. 1), through interactions with an administrator. Thus, an administrator can create the at least attribute for programming into the adaptive control entity at run-time of the adaptive control entity.

In one form, the policy is defined by a data model for a set of attributes, used when evaluating the one or more data streams. The data model may include one or more new attributes programmed or added at run-time. That is, the method 600 may further include, at run-time of the adaptive control entity, programming one or more new attributes to be used as part of the data model.

The method 600 may further include, at run-time of the adaptive control entity, programming a script that performs one or more functions mapped to the set of attributes when evaluating the one or more data streams against the policy.

Further still, the policy may be based on a source of the one or more data streams, a destination of the one or more data streams, a process state associated with the one or more data streams, an application of the system or process, and one or more conditions related to the state or operational environment. The one or more data streams may be network traffic and the process state is based on a network transport protocol. In another form, the one or data streams originate from an external entity to the adaptive control entity, such as a resource in a datacenter.

As described above, the adaptive control entity may be an enforcement point, such as a firewall or a gateway.

FIG. 7 illustrates a hardware block diagram of a computing device 700 that may perform the functions of any of the servers or the policy enforcement point/network control entity referred to herein. It should be appreciated that FIG. 6 provides only an illustration of one embodiment and does not imply any limitations with regard to the environments in which different embodiments may be implemented. Many modifications to the depicted environment may be made.

As depicted, the device 700 includes a bus 712, which provides communications between computer processor(s) 714, memory 716, persistent storage 718, communications unit 720, and input/output (I/O) interface(s) 722. Bus 712 can be implemented with any architecture designed for passing data and/or control information between processors (such as microprocessors, communications and network processors, etc.), system memory, peripheral devices, and any other hardware components within a system. For example, bus 712 can be implemented with one or more buses.

Memory 716 and persistent storage 718 are computer readable storage media. In the depicted embodiment, memory 716 includes random access memory (RAM) 724 and cache memory 726. In general, memory 716 can include any suitable volatile or non-volatile computer readable storage media. Instructions for the Control Logic 717 may be stored in memory 716 or persistent storage 718 for execution by processor(s) 714.

One or more programs may be stored in persistent storage 718 for execution by one or more of the respective computer processors 714 via one or more memories of memory 716. The persistent storage 718 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 718 may also be removable. For example, a removable hard drive may be used for persistent storage 718. Other examples include optical and magnetic disks, thumb drives, and smart cards that are inserted into a drive for transfer onto another computer readable storage medium that is also part of persistent storage 718.

Communications unit 720, in these examples, provides for communications with other data processing systems or devices. In these examples, communications unit 720 includes one or more network interface cards. Communications unit 720 may provide communications through the use of either or both physical and wireless communications links.

I/O interface(s) 722 allows for input and output of data with other devices that may be connected to computer device 700. For example, I/O interface 722 may provide a connection to external devices 728 such as a keyboard, keypad, a touch screen, and/or some other suitable input device. External devices 728 can also include portable computer readable storage media such as database systems, thumb drives, portable optical or magnetic disks, and memory cards.

Software and data used to practice embodiments can be stored on such portable computer readable storage media and can be loaded onto persistent storage 718 via I/O interface(s) 722. I/O interface(s) 722 may also connect to a display 730. Display 730 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Presented herein is a system, device, software process and method that involve creating a policy model and policy rule structure for a policy enforcement point to support policies adapted to rapid changing external conditions in addition to traditional policies that are static. The system facilitates the use of attributes that are either or both dynamically (at run-time) created and/or defined as ephemeral. A new policy attribute may be created dynamically (at run-time). The policy attribute may be mapped as being static or ephemeral. The methodology further involves facilitating evaluation of an attribute as an atomic (single function) or programmed set of functions. It is also possibility the evaluation of a policy attribute may return non-deterministic results, necessitating additional evaluation, of one or more other attributes. In other words, the enforcement may be more complex than a simple Allow/Deny (yes/no), but instead could lead to other (programmable) expressions or evaluations.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
at run-time of an adaptive control entity:
programming a policy that is associated with a state of an operational environment of a system or process;
programming at least one attribute to be used by the policy, the at least one attribute related to the state of the operational environment of the system or process and is defined based on a programmable script obtained from a schema management entity, wherein programming the at least one attribute to be used by the policy includes configuring the adaptive control entity, during running operations, to define a new attribute comprising an operational data label that maps to the programmable script provided by the schema management entity to the adaptive control entity via an application programming interface, wherein the new attribute is defined as a tuple, an ephemeral attribute, or a programmed ephemeral attribute;
programming at least one rule of the policy that references the at least one attribute; and
evaluating one or more data streams received by the adaptive control entity against the policy to determine an outcome.

2. The method of claim 1, wherein the at least one attribute is associated with an ephemeral condition of the operational environment of the system or process.

3. The method of claim 1, wherein the policy is defined by a data model for a set of attributes including the new attribute.

4. The method of claim 3, further comprising, at the run-time of the adaptive control entity:
programming one or more new attributes to be used as part of the data model.

5. The method of claim 3, further comprising, at the run-time of the adaptive control entity:
programming a script that performs one or more functions mapped to the set of attributes when evaluating the one or more data streams against the policy.

6. The method of claim 1, wherein the policy is based on a source of the one or more data streams, a destination of the one or more data streams, a process state associated with the one or more data streams, an application of the system or process, and one or more conditions related to the state of the operational environment.

7. The method of claim 6, wherein the one or more data streams is network traffic that is originating from an external entity and the process state is based on a network transport protocol.

8. The method of claim 1, wherein programming the at least one attribute to be used by the policy includes:
programming at least one attribute not predefined in the adaptive control entity, and
wherein the at least one rule defines how the at least one attribute is to be evaluated.

9. The method of claim 1, wherein the adaptive control entity is configured to evaluate a packet in the one or more data streams based on the policy that uses the new attribute and one or more operating conditions defined in the programmable script mapped thereto.

10. The method of claim 1, further comprising:
verifying, by the adaptive control entity, that the at least one attribute is valid before programming the at least one rule of the policy that references the at least one attribute.

11. The method of claim 1, wherein the new attribute is the tuple and includes a name, an invocation condition indicating whether it is to be invoked on at least one of a per-flow basis or a per packet basis.

12. An apparatus comprising: an interface configured to receive one or more data streams;
a memory configured to store instructions and data; and
a processor coupled to the interface and the memory and configured to execute the instructions causing the processor to perform operations including, at run-time:
programming a policy that is associated with a state of an operational environment of a system or process;
programming at least one attribute to be used by the policy, the at least one attribute related to the state of the operational environment of the system or process and is defined based on a programmable script obtained from a schema management entity, wherein programming the at least one attribute to be used by the policy includes configuring the processor, during running operations, to define a new attribute comprising an operational data label that maps to the programmable script provided by the schema management entity to the processor via an application programming interface, wherein the new attribute is defined as a tuple, an ephemeral attribute, or a programmed ephemeral attribute;
programming at least one rule of the policy that references the at least one attribute; and
evaluating the one or more data streams against the policy to determine an outcome.

13. The apparatus of claim 12, wherein the at least one attribute is associated with an ephemeral condition of the operational environment of the system or process.

14. The apparatus of claim 13, wherein the policy is defined by a data model for a set of attributes, and wherein the processor is configured to, at the run-time, program one or more new attributes to be used as part of the data model.

15. The apparatus of claim 14, wherein the processor is further configured to, at the run-time, programming a script that performs one or more functions mapped to the set of attributes when evaluating the one or more data streams against the policy.

16. The apparatus of claim 12, wherein the policy is based on a source of the one or more data streams, a destination of the one or more data streams, a process state associated with the one or more data streams, an application of the system or process, and one or more conditions related to the state or operational environment.

17. The apparatus of claim 16, wherein the one or more data streams is network traffic and the process state is based on a network transport protocol.

18. One or more non-transitory computer readable storage media encoded with instructions that, when executed by a processor, cause the processor to perform operations including:
at run-time of an adaptive control entity:
programming a policy that is associated with a state of an operational environment of a system or process;
programming at least one attribute to be used by the policy, the at least one attribute related to the state of the operational environment of the system or process and is defined based on a programmable script obtained from a schema management entity, wherein programming the at least one attribute to be used by the policy includes configuring the adaptive control entity, during running operations, to define a new attribute comprising an operational data label that maps to the programmable script provided by the schema management entity to the adaptive control entity via an application programming interface, wherein the new attribute is defined as a tuple, an ephemeral attribute, or a programmed ephemeral attribute;

programming at least one rule of the policy that references the at least one attribute; and evaluating one or more data streams received by the adaptive control entity against the policy to determine an outcome.

19. The non-transitory computer readable storage media of claim 18, wherein the at least one attribute is associated with an ephemeral condition of the operational environment of the system or process.

20. The non-transitory computer readable storage media of claim 19, wherein the policy is defined by a data model for a set of attributes.

* * * * *